United States Patent
Jung et al.

(10) Patent No.: US 8,754,996 B2
(45) Date of Patent: Jun. 17, 2014

(54) LIQUID CRYSTAL DISPLAY PANEL AND MANUFACTURING METHOD THEREOF

(75) Inventors: Jin-Goo Jung, Yongin (KR); Yu-Bong Won, Yongin (KR); Chung Yi, Yongin (KR); Jae-Sic Lee, Yongin (KR)

(73) Assignee: Samsung Display Co., Ltd., Yongin, Gyeongg-Do (KR)

( * ) Notice: Subject to any disclaimer, the term of this patent is extended or adjusted under 35 U.S.C. 154(b) by 176 days.

(21) Appl. No.: 13/198,747

(22) Filed: Aug. 5, 2011

(65) Prior Publication Data

US 2012/0120360 A1    May 17, 2012

(30) Foreign Application Priority Data

Nov. 11, 2010 (KR) ........................ 10-2010-0112207

(51) Int. Cl.
*G02F 1/1343* (2006.01)

(52) U.S. Cl.
USPC ................... 349/39; 349/40; 257/59; 257/72; 438/30

(58) Field of Classification Search
CPC ................... G02F 1/136213; G02F 1/136286; G02F 1/136204
USPC .............. 349/39, 141, 40; 257/59, 72; 438/30
See application file for complete search history.

(56) References Cited

U.S. PATENT DOCUMENTS

| 7,898,515 | B2 | 3/2011 | Moon et al. |
| 2002/0153569 | A1* | 10/2002 | Katayama ..................... 257/351 |
| 2003/0133054 | A1* | 7/2003 | Taguchi et al. ................. 349/38 |
| 2004/0125308 | A1* | 7/2004 | Park et al. ..................... 349/149 |
| 2006/0181664 | A1* | 8/2006 | Yoo et al. ..................... 349/141 |
| 2007/0085960 | A1* | 4/2007 | Kim ............................. 349/149 |

FOREIGN PATENT DOCUMENTS

| KR | 10-2006-0014328 A | 2/2006 |
| KR | 10-2007-0002742 A | 1/2007 |
| KR | 10-2009-0043749 A | 5/2009 |

* cited by examiner

*Primary Examiner* — Michael Caley
(74) *Attorney, Agent, or Firm* — Lee & Morse, P.C.

(57) ABSTRACT

Embodiments relate to a liquid crystal display panel and a manufacturing method thereof. The liquid crystal display panel includes a first substrate; a second substrate facing the first substrate; a liquid crystal layer between the first substrate and the second substrate; a gate line extended in a first direction on the first substrate; a data line on the first substrate and extended in a second direction, crossing the first direction; and a common voltage line on the same layer as the gate line. The common voltage line includes: a plurality of first lines and a plurality of second lines extended in the first direction and separately disposed with a cutting unit therebetween; a first connector for connecting the first lines; and a second connector for connecting the second lines.

13 Claims, 6 Drawing Sheets

LIQUID CRYSTAL DISPLAY PANEL AND MANUFACTURING METHOD THEREOF

BACKGROUND

1. Field

The described technology relates to a liquid crystal display panel and a manufacturing method thereof. More particularly, the described technology relates to a liquid crystal display panel using a PMOS transistor, and a manufacturing method thereof.

2. Description of the Related Art

A liquid crystal display (LCD) is widely used for small products, e.g. a cellular phone, a personal digital assistant (PDA), and a portable multimedia player (PMP). A LCD is widely used for smaller products due to small size, light weight, and lower power consumption.

The liquid crystal display includes a liquid crystal display panel displaying pixel data using an optical characteristic of a liquid crystal, a printed circuit board with a driving circuit for driving the liquid crystal display panel, a back-light assembly including a light source for displaying a screen, and a mold frame receiving the back-light assembly. The liquid crystal display panel includes an array substrate with a thin film transistor (TFT), a color filter substrate with a color filter (CF), and a liquid crystal interposed therebetween, and it displays images by driving and controlling the liquid crystal on the basis of an electric field difference between the array substrate and the color filter substrate.

The information in the Background is only for enhancing an understanding of the technology. Thus, it may contain information that does not form the prior art known to a person of ordinary skill in the art in this country.

SUMMARY

Embodiments have been made in an effort to provide a liquid crystal display panel and a liquid crystal display panel manufacturing method.

An exemplary embodiment may provide a liquid crystal display panel including: a first substrate; a second substrate facing the first substrate; a liquid crystal layer between the first substrate and the second substrate; a gate line extended in a first direction on the first substrate; a data line on the first substrate and extended in a second direction, crossing the first direction; and a common voltage line on the same layer as the gate line.

The common voltage line may include: a plurality of first lines and a plurality of second lines extended in the first direction and separately disposed with a cutting unit therebetween; a first connector for connecting the first lines; and a second connector for connecting the second lines.

The first connector and the second connector may be electrically connected to the data line, respectively.

The first connector and the second connector may be extended in the second direction.

The first connector connects ends may be provided at an edge of the first lines, and the second connector may connect ends provided at an edge of the second lines.

The liquid crystal display panel may further include: an active layer on the first substrate and including a channel; a gate electrode connected to the gate line and provided to correspond to the channel of the active layer with a gate insulating layer therebetween; a source electrode provided between the gate electrode and an interlayer insulating layer, connected to the data line, and connected to a source region of the active layer through a first contact hole in the gate insulating layer and the interlayer insulating layer; a drain electrode provided between the gate electrode and the interlayer insulating layer, separately provided from the source electrode, and connected to a drain region of the active layer through a second contact hole in the gate insulating layer and the interlayer insulating layer; and a pixel electrode provided between the drain electrode and a protective layer, and connected to the drain electrode through a via hole in the protective layer.

Another embodiment may provide a method for manufacturing a liquid crystal display panel, including: forming an active layer and a gate insulating layer for covering the active layer on a substrate; forming a gate line extended in a first direction and a gate electrode connected to the gate line on the gate insulating layer; forming a common voltage line, including a plurality of lines, extended in the first direction, and a connector for connecting the lines on the gate insulating layer; doping ions in the first direction; forming an interlayer insulating layer, for covering the gate line and the common voltage line; and forming a data line in a second direction, crossing the first direction on the interlayer insulating layer.

The plurality of lines may include a plurality of first lines and a plurality of second lines separately disposed with a cutting unit therebetween, and the connector may include a first connector for connecting the first lines and a second connector for connecting the second lines.

The first connector and the second connector may be extended in the second direction.

The first connector may connect ends positioned at an edge of the first lines, the second connector may connect ends positioned at an edge of the second lines.

A hole may be formed in the interlayer insulating layer, and the connector and the data line may be connected through the hole.

A first contact hole and a second contact hole may be formed in the interlayer insulating layer, a source electrode may be connected to the data line and may be connected to a source region of the active layer through the first contact hole, and a drain electrode may be separated from the source electrode and may be connected to a drain region of the active layer through the second contact hole, are formed on the interlayer insulating layer, a protective layer for covering the data line, the source electrode, and the drain electrode may be formed, a via hole may be formed on the protective layer, and a pixel electrode, connected to the drain electrode through the via hole, may be formed.

Yet another embodiment may provide a method for manufacturing a liquid crystal display panel, including: forming an active layer and a gate insulating layer for covering the active layer on a substrate; forming a gate line extended in a first direction, a gate electrode connected to the gate line, and a common voltage line on the gate insulating layer; doping ions in a second direction, crossing the first direction; forming an interlayer insulating layer for covering the gate line and the common voltage line; and forming a data line in the second direction, on the interlayer insulating layer.

DETAILED DESCRIPTION

Korean Patent Application No. 10-2010-0112207, filed on Nov. 11, 2010, in the Korean Intellectual Property Office, and entitled "Liquid Crystal Display Panel and Manufacturing Method Thereof," is incorporated by reference herein in its entirety.

The inventive concept will now be described more fully hereinafter with reference to the accompanying drawings, in which exemplary embodiments of the inventive concept are illustrated. The inventive concept may, however, be embodied in different forms and should not be construed as limited to the embodiments set forth herein. Rather, these embodiments are provided so that this disclosure will be thorough and complete, and will fully convey the scope of the invention to those skilled in the art.

Like reference numerals designate like elements throughout the specification. The size and thickness of each component shown in the drawings are arbitrarily shown for understanding and ease of description, but the present invention is not limited thereto. In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present.

Figure 1:
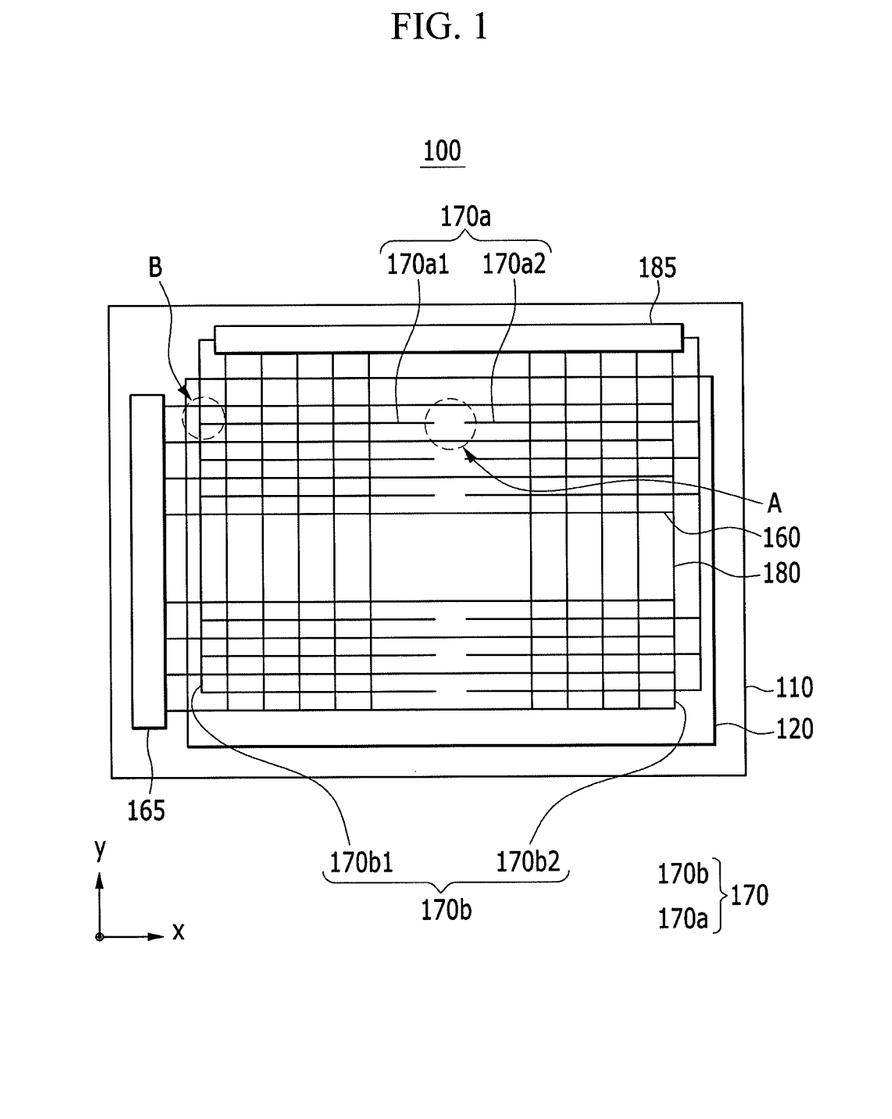
FIG. 1 shows a top plan view of a liquid crystal display panel according to an exemplary embodiment.

FIG. 1 shows a top plan view of a liquid crystal display panel according to an exemplary embodiment.

Referring to FIG. 1, the liquid crystal display panel 100 includes a first substrate 110, a second substrate 120, and a liquid crystal layer (not shown) provided between the first substrate 110 and the second substrate 120. The first substrate 110 is an array substrate on which thin film transistors are formed. The second substrate 120 is a color filter substrate on which color filters are formed.

Gate lines 160, common voltage lines 170, and data lines 180 are formed on the first substrate 110. In FIG. 1, each gate line 160 is provided in the x-axis direction (hereinafter, the first direction) and each data line 180 is provided in the y-axis direction (hereinafter, the second direction). Furthermore, in FIG. 1, the gate lines 160 and the data lines 180 cross each other in an insulated manner in a display area of the first substrate 110. Each region where a gate line 160 crosses a data line 180 forms a pixel area.

A gate driver 165 and a data driver 185 are formed in a non-display area of the first substrate 110. The gate driver 165, electrically connected to the gate line 160, outputs a gate signal to the gate line 160. The data driver 185, electrically connected to the data line 180, outputs a data signal to the data line 180. A flexible circuit board (not shown) may be attached to the non-display area of the first substrate 110 for receiving an external signal from an external device and providing it to the gate driver 165 and the data driver 185.

The common voltage line 170 includes a plurality of lines 170a formed in parallel with the first direction, and a connector 170b for connecting the lines 170a. The lines 170a include a plurality of first lines 170a1 and a plurality of second lines 170a2 that are separated with gaps among them. The connector 170b includes a first connector 170b1 for connecting the first lines 170a1 and a second connector 170b2 for connecting the second lines 170a2. Hereinafter, a separated part provided between the first lines 170a1 and the second lines 170a2 will be called a cutting unit. That is, the first lines 170a1 and the second lines 170a2 are disposed in a separate manner with the cutting unit therebetween.

The cutting unit of the lines 170a may be substantially formed in the middle of the lines 170a. The first lines 170a1 and the second lines 170a2 can be symmetrically formed with reference to the cutting unit. The first lines 170a1 and the second lines 170a2 are connected to the first connector 170b1 and the second connector 170b2, respectively. The first connector 170b1 and the second connector 170b2 apply the common voltage signal to the first lines 170a1 and the second lines 170a2.

The first connector 170b1 is formed to connect ends on the edge of the first lines 170a1, and the second connector 170b2 is formed to connect ends on the edge of the second lines 170a2. Also, the first connector 170b1 and the second connector 170b2 can be provided in a second direction to be in parallel with the data line 180.

The common voltage line 170 is formed to be insulated from the gate line 160. The common voltage line 170 is electrically connected to the data line 180 to receive a voltage therefrom.

The common voltage line 170 is formed in the same layer as the gate line 160. The lines 170a are formed in parallel with the gate line 160 in the first direction. The gate line 160 is connected to the part where the second connector 170b2 is formed by using a bridge electrode with the second connector 170b2 therebetween. The common voltage line 170 and the gate line 160 are electrically insulated from each other.

The common voltage lines 170 are formed with the data line 180, the interlayer insulating layer therebetween. A hole may be formed on a part of the interlayer insulating layer between the common voltage line 170 and the data line 180 for their electrical connection. For example, a hole is formed on the interlayer insulating layer of the data driver 185 to electrically connect the first connector 170b1 and the second connector 170b2 of the common voltage line 170 to the data line 180.

On the liquid crystal display panel 100, the first line 170a1 and the second line 170a2 are separately disposed with the cutting unit therebetween. The first line 170a1 and the second line 170a2 are connected to the first connector 170b1 and the second connector 170b2, thereby suppressing generation of static electricity. During the process for doping the ions to the active layer, suppression of static electricity occurs by forming an equivalent potential over the whole common voltage line 170.

The first connector 170b1 and the second connector 170b2 are electrically connected to the data line 180 to input signals from both sides of the first lines 170a1 and the second lines 170a2. Thus, the voltage drop is minimized while transmitting the signals, and efficiency of inputting signals is improved.

Figure 2:
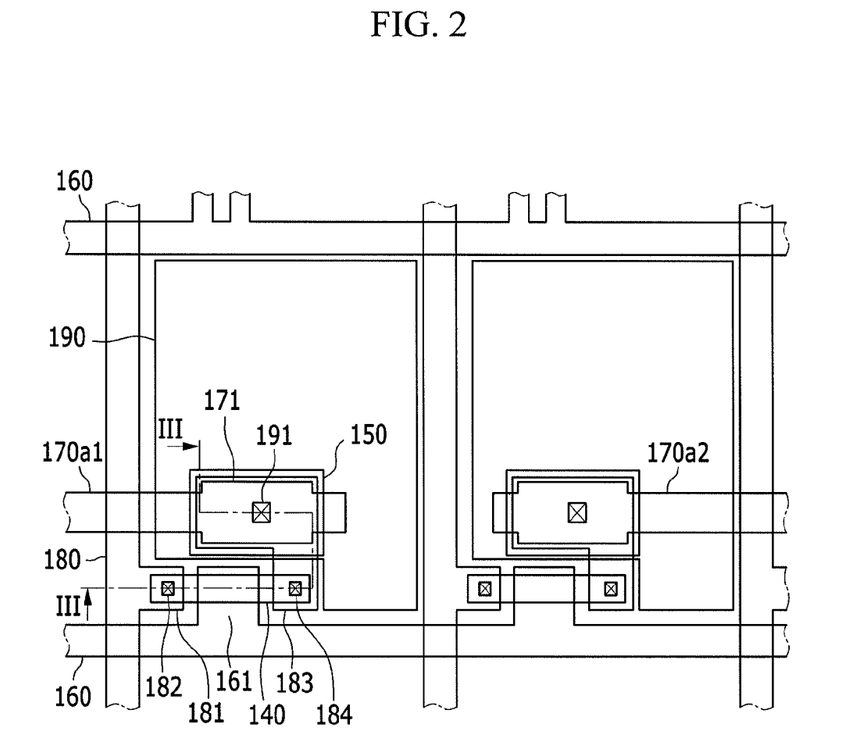
FIG. 2 shows a top plan layout view of a pixel area of a liquid crystal display panel magnifying the part "A" of FIG. 1.
Figure 3:
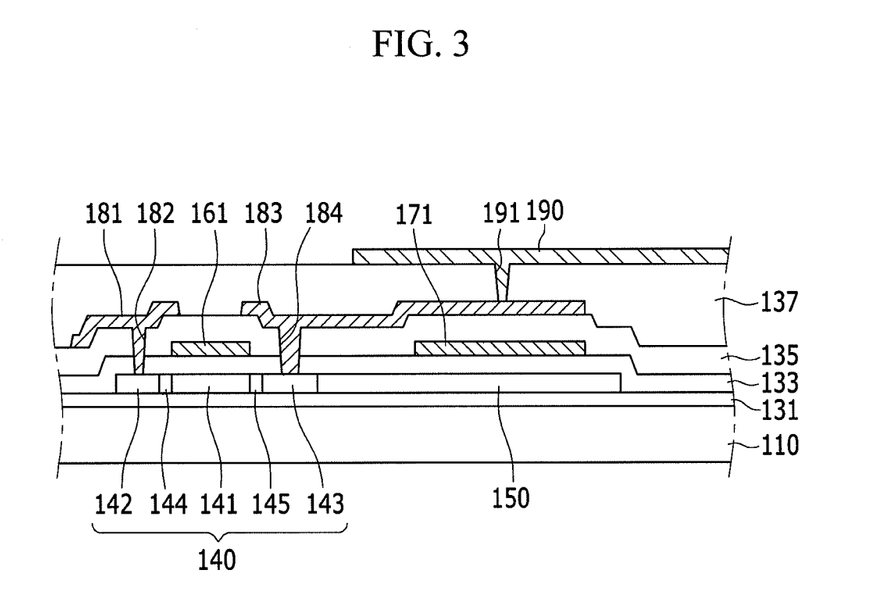
FIG. 3 shows a cross-sectional view of a liquid crystal display panel with respect to a line III-III of FIG. 2.

FIG. 2 shows a top plan layout view of a pixel area of a liquid crystal display panel magnifying the part "A" of FIG. 1. FIG. 3 shows a cross-sectional view of a liquid crystal display panel with respect to a line III-III of FIG. 2, and an internal configuration of a liquid crystal display panel 100 according to an exemplary embodiment. A manufacturing method thereof will now be described with reference to the drawings.

Referring to FIGS. 2-3, a thin film transistor is formed on the first substrate 110. The thin film transistor includes an active layer 140, a gate electrode 161, a source electrode 181, and a drain electrode 183, a storage capacitor including a first storage plate 150 and a second storage plate 171, and a pixel electrode 190.

A region where a thin film transistor is formed will be described with reference to the bottom part of the pixel area of FIG. 2 and the left part of FIG. 3.

The first substrate 110 can be formed with an insulation material, e.g., glass. A buffer layer 131, including silicon nitride ($SiN_x$) or silicon oxide ($SiO_x$) is formed on the first substrate 110. The buffer layer 131 prevents foreign particles of the first substrate 110 from entering the active layer 140 and damaging the active layer 140 during the process of forming the active layer 140.

The active layer 140, formed with polysilicon, is formed on the buffer layer 131. The active layer 140 is formed with an amorphous silicon layer on the buffer layer 131, patterning the amorphous silicon layer with a first mask, and crystallizing the patterned amorphous silicon layer by applying heat.

A gate insulating layer 133 including silicon nitride or silicon oxide is formed on the active layer 140 to insulate the active layer 140 and the gate electrode 161. A gate line 160 and a gate electrode 161 connected to the gate line 160, are formed on the gate insulating layer 133. The gate line 160 and the gate electrode 161 may include low resistance metals, e.g., silver, aluminum, molybdenum, or alloys thereof. The gate line 160 and the gate electrode 161 are formed through patterning with a second mask. The formed gate line 160 is connected to the gate driver 165, and transmits a gate signal to the gate electrode 161.

When the gate electrode 161 is formed, ions are doped to the active layer 140 by using the gate electrode 161 as a mask. A source region 142 and a drain region 143 doped with p+ impurities, e.g., boron, and lightly doped drains LDD's 144 and 145, lightly doped with p– impurities, are formed on the active layer 140. A channel region 141 is formed in the middle of the active layer 140, in which no ions are doped.

An interlayer insulating layer 135, including silicon nitride or silicon oxide, is formed on the gate line 160 and the gate electrode 161. A first contact hole 182 and a second contact hole 184 are formed on the interlayer insulating layer 135 by using a third mask. A data line 180, a source electrode 181, and a drain electrode 183 are formed on the interlayer insulating layer 135 by using a fourth mask. The data line 180, the source electrode 181, and the drain electrode 183 are formed with low resistance metals, e.g., silver, aluminum, molybdenum, or alloy thereof.

The source electrode 181 is connected to the data line 180. The source electrode 181 is connected to the source region 142 of the active layer 140 through the first contact hole 182, passing through the interlayer insulating layer 135 and the gate insulating layer 133. The drain electrode 183 is separately formed from the source electrode 181. The drain electrode 183 is connected to the drain region 143 of the active layer 140 through the second contact hole 184, passing through the interlayer insulating layer 135 and the gate insulating layer 133. The data line 180 is connected to the data driver 185 and transmits a data signal to the source electrode 181.

A driving voltage is supplied to the pixel electrode 190. The pixel electrode will be described according to the thin film transistor. The thin film transistor includes the active layer 140, the gate electrode 161, the source electrode 181, and the drain electrode 183. The configuration of the thin film transistor may be varied by a person of ordinary skill in the art.

A region in which a storage capacitor is formed will be described with reference to the central part of FIG. 2 and the right part of FIG. 3.

A first storage plate 150 is formed on the same layer as the active layer 140. The first storage plate 150 is formed with polysilicon in a like manner of the active layer 140.

A common voltage line 170 and a second storage plate 171 connected to the common voltage line 170 is provided on the top part of the first storage plate 150. The common voltage line 170 and a second storage plate 171 are formed on the top part of the gate insulating layer 133. The common voltage line 170 and the second storage plate 171 are formed with low resistance metals, e.g., silver, aluminum, molybdenum, or alloys thereof.

The first storage plate 150 and the second storage plate 171 form a storage capacitor, with the gate insulating layer 133 provided therebetween as a dielectric material. The first storage plate 150 and the second storage plate 171 maintain the voltage signal applied to the pixel electrode 190.

As shown in FIG. 1 and FIG. 3, the common voltage line 170 includes lines 170a formed in parallel with the gate line 160 in the first direction. The common voltage line 170 also includes a connector 170b for connecting the lines 170a. The first line 170a1 and the second line 170a2 are separately formed, with a cutting unit therebetween, in the pixel area. The pixel area is provided in the center of the display area. The first line 170a1 and the second line 170a2 receive a voltage through the first connector 170b1 and the second connector 170b2, respectively. The first connector 170b1 and the second connector 170b2 are electrically connected to the data line 180. Thus, a voltage drop is minimized when the common voltage signal is transmitted.

Referring to FIGS. 2-3, a protective layer 137 is formed on the data line 180, the source electrode 181, and the drain electrode 183. The protective layer 137 is formed with an inorganic layer or an organic layer.

When the protective layer 137 is stacked, a via hole is formed on the top part of the drain electrode 183 by using a fifth mask. A pixel electrode 190 is formed through patterning using a sixth mask. The pixel electrode 190 is connected to the drain electrode 183 through a via hole 191 to receive a driving voltage.

A second substrate 120, on which a common electrode (not shown) is formed, is disposed facing the first substrate 110. Liquid crystal is injected between the first substrate 110 and the second substrate 120 to form a liquid crystal layer (not shown). The pixel electrode 190 faces the common electrode with the liquid crystal layer therebetween. The liquid crystal layer applies a voltage to the pixel electrode 190 and the common electrode to form an electric field. Thus, an image is realized by driving the liquid crystal.

The pixel electrode 190 and the common electrode can be formed with a transparent electrode, e.g., indium tin oxide (ITO) or indium zinc oxide (IZO). Therefore, light would be transmitted toward the second substrate 120, facing the first substrate 110. The second substrate 120 can be formed with a transparent insulated substrate, e.g., glass.

Therefore, the liquid crystal display panel, having applied the PMOS transistor, can be manufactured by using 6 masks, improving process efficiency. In the process for doping the ions to the active layer, since the lines of the common voltage line are connected through the connector, generation of static electricity is suppressed. The first lines and the second lines are separately disposed with the cutting unit therebetween. The first lines and the second lines receive signals through the first connector and the second connector, respectively. Thus, the voltage drop can be suppressed when signals are input.

Figure 4:
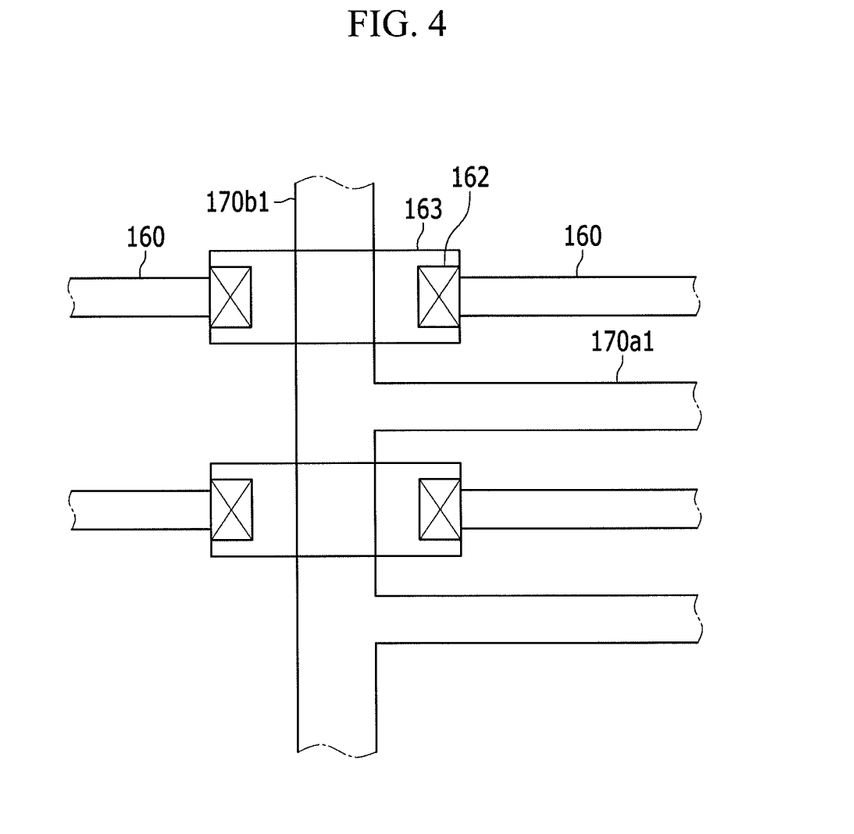
FIG. 4 shows a top plan layout view of a liquid crystal display panel magnifying the part of "B" in FIG. 1.

FIG. 4 shows a top plan layout view of a liquid crystal display panel, a magnified part of "B" in FIG. 1, and a position relationship between the gate line 160 and the first connector 170b1 of the common voltage line 170.

As described above, the gate line 160 and the common voltage line 170 are formed on the same layer. However, the gate line 160 and the common voltage line 170 are electrically insulated. The gate lines 160 can be connected through a bridge electrode 163. The first connector 170b1, of the common voltage line 170, is extended in a second direction.

Referring to FIG. 4, the gate lines 160 are formed to be disconnected from each other with the first connector 170b1 therebetween. Holes 162 are formed in the interlayer insulating layer, on the top part of the gate lines 160. The bridge electrode 163, made of a conductive material, is formed on the interlayer insulating layer. The gate lines 160 are electrically connected with the first connector 170b1 therebetween.

The configuration shown in the drawing exemplifies connection of the gate lines 160 with the first connector 170b1 therebetween. The connections among the gate lines 160 can occur by various methods that would be known to a person of ordinary skill in the art.

Hereinafter, ion doping methods, according to exemplary embodiments, will be described with reference to FIGS. 5-6.

Figure 5:
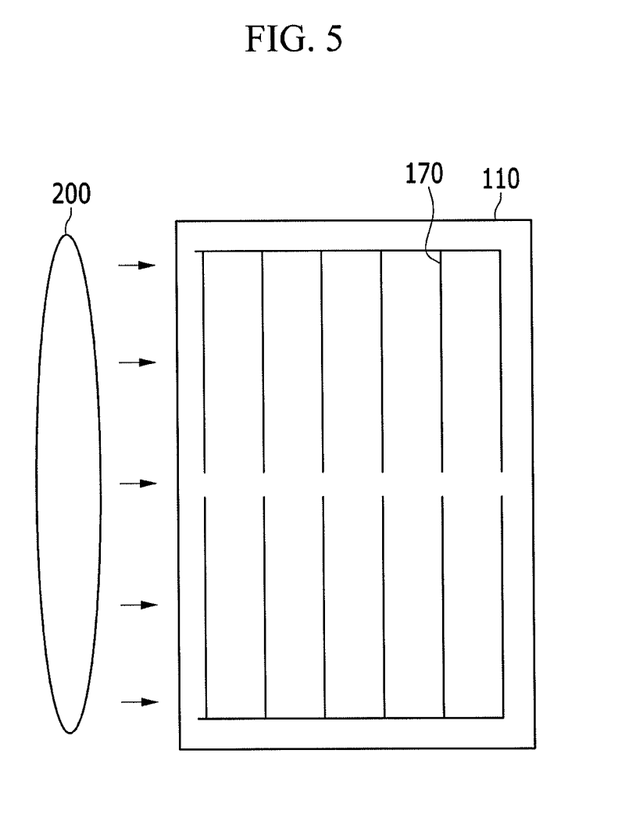
FIG. 5 shows an ion doping method of a liquid crystal display panel according to a first exemplary embodiment.

FIG. 5 shows an ion doping method of a liquid crystal display panel according to a first exemplary embodiment.

Referring to FIG. 5, when ion beams 200 are applied to the first substrate 110, on which the common voltage line 170 is formed, the lines of the common voltage line 170 scan the ion beams 200 along the direction vertical to their extended direction.

Accordingly, when the ions are doped to the active layer by using the ion beams 200, no potential difference is generated by the lines of the common voltage line 170. Thus, no current leakage path is formed between the common voltage line 170 and the active layer. In the ion doping process, bad pixels caused by static electricity can be controlled by scanning the ion beams 200 to the lines of the common voltage line 170 in the vertical direction.

Figure 6:
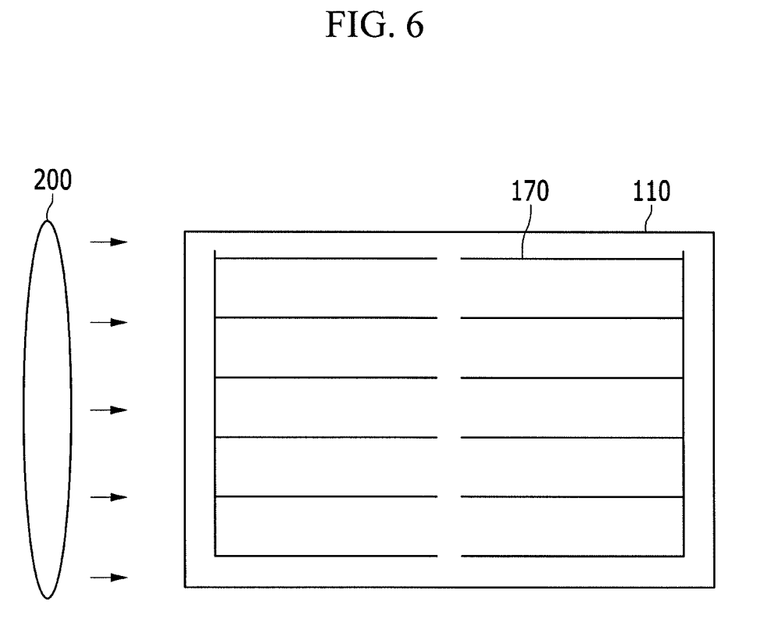
FIG. 6 shows an ion doping method of a liquid crystal display panel according to a second exemplary embodiment.

FIG. 6 shows an ion doping method of a liquid crystal display panel according to a second exemplary embodiment.

Referring to FIG. 6, as shown in FIG. 1, when the ion beams 200 are scanned to the first substrate 110, on which the common voltage line 170 is formed, the lines of the common voltage line 170 scan the ion beams 200 in the direction horizontal to the extended direction.

A potential difference may occur at the lines of the common voltage line 170. In the present exemplary embodiment, the first lines and the second lines of the common voltage line 170 are connected together through the first connector and the second connector. Therefore, no potential difference occurs among the lines. During the ion doping process, the bad pixels caused by static electricity are suppressed. Thus, no current leakage path is formed between the common voltage line 170 and the active layer.

When the common voltage line of the liquid crystal display panel is formed, since a plurality of lines and connectors for connecting them are formed together, the lines of the common voltage line scan the ion beams in the vertical or horizontal direction of the extended direction. This scanning suppresses the bad pixels generated by static electricity. The direction to scan the ion beams can be determined in a flexible manner. Depending on the process, the elongation direction of the gate line does not need to be limited to a predetermined direction. The pixels can be disposed by controlling the elongation directions of the gate line and the data line. Efficiency of disposing the pixels on the substrate, i.e., substrate usage efficiency, is increased.

In the conventional liquid crystal display (LCD) manufacturing method, a thin film transistor can be formed with a PMOS transistor so as to increase process efficiency by reducing the number of masks used. However, when the thin film transistor is formed with the PMOS transistor, a relatively strong electric field is formed between an active layer to which positive charges are doped and a substrate charged with negative charges. While doping ions to the active layer, pixel areas may be relatively weak in terms of static electricity. Therefore, a source/drain electrode structure is formed during the liquid crystal display panel manufacturing process. Furthermore, the charges may be non-uniformly charged along a common voltage line. The common voltage line is provided on the top part of the active layer in the ion doping process. The non-uniform charging may form static electricity between the common voltage line and the active layer. Thus, a current leakage path is formed, and bad pixels are generated.

Present embodiments have been made to provide a liquid crystal display for suppressing bad pixels caused by generation of static electricity and maximizing efficiency of the substrate. Embodiments have also been made to provide a liquid crystal display panel manufacturing method for improving process efficiency by reducing the number of masks used.

According to the embodiments, bad pixels can be prevented by suppressing static electricity in the pixel area. Furthermore, process efficiency can be improved by applying the PMOS transistor and reducing the number of masks used for the process. Efficiency of the substrate can also be maximized by arranging the pixels irrespective of the ion doping direction in the liquid crystal display panel manufacturing process.

Exemplary embodiments of the inventive concept have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the inventive concepts as set forth in the following claims.

What is claimed is:

1. A liquid crystal display panel, comprising:
a first substrate;
a second substrate facing the first substrate;
a liquid crystal layer between the first substrate and the second substrate;
a plurality of gate lines extended in a first direction on the first substrate;
a plurality of data lines on the first substrate and extended in a second direction, crossing the first direction, wherein each region where a gate line crosses a data line forms a pixel area;
a plurality of pixel rows, each pixel row consisting essentially of a first portion, a second portion, and a gap in between the first and second portions, the first portion of each pixel row including a first plurality of adjacent pixel areas, and the second portion of each pixel row including a second plurality of adjacent pixel areas; and
a common voltage line on a same layer as the plurality of gate lines, wherein the common voltage line includes:
a plurality of first lines and a plurality of second lines, each first line corresponding to a second line;
a first connector for connecting the first lines; and
a second connector for connecting the second lines, wherein:
each first line extends across the first portion of the pixel row in the first direction, and each second line extends across the second portion of the pixel row in the first direction, each first line extending along a same pixel row as the second line corresponding thereto, and
a cutting unit is disposed in between each first line and corresponding second line in the gap between the first portion and second portion of the pixel row.

2. The liquid crystal display panel as claimed in claim 1, wherein:
the first connector and the second connector are electrically connected to the data lines, respectively.

3. The liquid crystal display panel as claimed in claim 1, wherein:
the first connector and the second connector are extended in the second direction.

4. The liquid crystal display panel as claimed in claim 1, wherein:
the first connector connects ends provided at an edge of the first lines, and
the second connector connects ends provided at an edge of the second lines.

5. The liquid crystal display panel as claimed in claim 1, wherein each pixel area includes:
an active layer on the first substrate and including a channel;
a gate electrode, connected to a gate line of the pixel area, and provided to correspond to the channel of the active layer with a gate insulating layer therebetween;
a source electrode provided between the gate electrode and an interlayer insulating layer, connected to a data line of the pixel area, and connected to a source region of the active layer through a first contact hole in the gate insulating layer and the interlayer insulating layer;
a drain electrode provided between the gate electrode and the interlayer insulating layer, separately provided from the source electrode, and connected to a drain region of the active layer through a second contact hole in the gate insulating layer and the interlayer insulating layer; and
a pixel electrode provided between the drain electrode and a protective layer, and connected to the drain electrode through a via hole in the protective layer.

6. The liquid crystal display panel as claimed in claim 1, further comprising first and second gate lines, wherein the first and second gate lines are parallel to the plurality of first and second common voltage lines, and wherein at least one first and second common voltage lines are disposed in between the first and second gate lines.

7. A method for manufacturing a liquid crystal display panel, the method comprising:
forming an active layer and a gate insulating layer for covering the active layer on a substrate;
forming a plurality of gate lines extended in a first direction, and a gate electrode connected to the plurality of gate lines on the gate insulating layer;
forming a common voltage line including a plurality of first lines and a plurality of second lines extended in the first direction, and separately disposed with a cutting unit therebetween;
forming a connector for connecting the lines on the gate insulating layer, the connector including a first connector for connecting the first lines on the gate insulating layer, and a second connector for connecting the second lines on the gate insulating layer, wherein the first connector extends in the second direction and contacts each of the plurality of first lines and a first end of a data driver, and the second connector extends in the second direction and contacts each of the plurality of second lines and a second end of the data driver;
doping ions in the first direction;
forming an interlayer insulating layer, for covering the plurality of gate lines and the common voltage line; and
forming a plurality of data lines in a second direction, crossing the first direction on the interlayer insulating layer, wherein each region where a gate line crosses a data line forms a pixel area, and wherein the plurality of first and second lines extend along adjacent pixel areas.

8. The method as claimed in claim 7, wherein:
the first connector and the second connector are extended in the second direction.

9. The method as claimed in claim 7, wherein:
the first connector connects ends positioned at an edge of the first lines, and
the second connector connects ends positioned at an edge of the second lines.

10. The method as claimed in claim 7, wherein:
a hole is formed in the interlayer insulating layer, the connector and the plurality of data lines are connected through the hole.

11. The method as claimed in claim 7, wherein for each of the plurality of data lines, the method includes:
forming a first contact hole and a second contact hole the interlayer insulating layer,
forming a source electrode, connected to the data line and connected to a source region of the active layer through the first contact hole, and a drain electrode, separated from the source electrode and connected to a drain region of the active layer through the second contact hole, on the interlayer insulating layer,
forming a protective layer for covering the data line, the source electrode, and the drain electrode,
forming a via hole on the protective layer, and
forming a pixel electrode connected to the drain electrode through the via hole.

12. A method for manufacturing a liquid crystal display panel, the method comprising:
forming an active layer and a gate insulating layer for covering the active layer on a substrate;
forming a plurality of gate lines extended in a first direction, a gate electrode connected to the gate line, and a common voltage line on the gate insulating layer;
doping ions in a second direction, crossing the first direction;
forming an interlayer insulating layer for covering the plurality of gate lines and the common voltage line; and
forming a plurality of data lines in the second direction, on the interlayer insulating layer, wherein each region where a gate line crosses a data line forms a pixel area,
forming a plurality of pixel rows, each pixel row consisting essentially of a first portion, a second portion, and a gap in between the first and second portions, the first portion of each pixel row including a first plurality of adjacent pixel areas, and the second portion of each pixel row including a second plurality of adjacent pixel areas; and wherein the common voltage line includes a plurality of first lines and a plurality of second lines, each first line corresponding to a second line, wherein:
each first line extends across the first portion of the pixel row in the first direction, and each second line extends across the second portion of the pixel row in the first direction, each first line extending along a same pixel row as the second line corresponding thereto, and
a cutting unit is disposed in between each first line and corresponding second line in the gap between the first portion and second portion of the pixel row.

13. A liquid crystal display panel, comprising:
a first substrate;
a second substrate facing the first substrate;
a liquid crystal layer between the first substrate and the second substrate;
a plurality of gate lines extended in a first direction on the first substrate;

a plurality of data lines on the first substrate and extended in a second direction, crossing the first direction, wherein each region where a gate line crosses a data line forms a pixel area; and a common voltage line on a same layer as the gate line, wherein the common voltage line includes:

a plurality of first lines and a plurality of second lines extended along adjacent pixel areas in the first direction and separately disposed with a cutting unit therebetween;

a first connector for connecting the first lines; and a second connector for connecting the second lines, wherein the first connector extends in the second direction and contacts each of the plurality of first lines and a first end of a data driver, and the second connector extends in the second direction and contacts each of the plurality of second lines and a second end of the data driver.

* * * * *